(12) United States Patent
Polz et al.

(10) Patent No.: US 6,964,316 B1
(45) Date of Patent: Nov. 15, 2005

(54) FRONT OPENING HOOD ASSEMBLY

(75) Inventors: Andreas Polz, Gelsenkirchen (DE);
Peter Schlegel, Wuppertal (DE);
Heiner Nadstawek, Gladbeck (DE)

(73) Assignee: Edscha AG, Remscheid (DE)

( * ) Notice: Subject to any disclaimer, the term of this patent is extended or adjusted under 35 U.S.C. 154(b) by 0 days.

(21) Appl. No.: 09/979,209

(22) PCT Filed: May 17, 2000

(86) PCT No.: PCT/DE00/01599

§ 371 (c)(1),
(2), (4) Date: Jan. 31, 2002

(87) PCT Pub. No.: WO00/69705

PCT Pub. Date: Nov. 23, 2000

(30) Foreign Application Priority Data

| May 17, 1999 | (DE) | ................................ 199 22 107 |
| May 17, 1999 | (DE) | ................................ 199 22 454 |
| May 17, 1999 | (DE) | ................................ 199 22 455 |
| Oct. 8, 1999 | (DE) | ................................ 199 48 459 |

(51) Int. Cl.⁷ .......................... B62D 25/12; B60R 21/34
(52) U.S. Cl. ...................... 180/274; 180/69.21; 16/222
(58) Field of Search .............. 180/271, 274, 180/69.21, 69.2; 16/222, 223, 289, 290; 296/187.04, 296/187.09

(56) References Cited

U.S. PATENT DOCUMENTS

| 1,838,898 | A | * | 12/1931 | Aldeen ........................ 16/289 |
| 3,351,975 | A | * | 11/1967 | Goto ........................... 16/288 |
| 4,587,760 | A | * | 5/1986 | Brissette ...................... 49/252 |
| 5,385,212 | A | * | 1/1995 | Cady et al. ............... 180/69.21 |
| 5,697,467 | A | | 12/1997 | Howard | |
| 5,758,389 | A | * | 6/1998 | Wolda .......................... 16/308 |
| 6,182,952 | B1 | * | 2/2001 | Gutierrez ................. 267/64.11 |
| 6,227,612 | B1 | * | 5/2001 | Stolle et al. ................. 296/208 |
| 6,269,521 | B1 | * | 8/2001 | Gabel .......................... 16/287 |

FOREIGN PATENT DOCUMENTS

| DE | 2711338 | 9/1978 |
| DE | 2711339 | 9/1978 |
| DE | 2737876 | 3/1979 |
| DE | 2841315 | 4/1980 |
| DE | 3047696 | 7/1982 |
| DE | 2922893 | 1/1989 |
| DE | 19721565 | 12/1997 |
| DE | 197 06 878 | 8/1998 |
| DE | 19710417 | 9/1998 |
| DE | 19712961 | 10/1998 |
| DE | 199 42 731 | 3/2001 |

(Continued)

OTHER PUBLICATIONS

International Search Report of PCT/DE00/01602.

*Primary Examiner*—David R. Dunn
(74) *Attorney, Agent, or Firm*—Davidson, Davidson & Kappel, LLC

(57) ABSTRACT

A front hood system has a front hood of a vehicle coupled to the frame of the vehicle via at least one four-joint hinge. In addition, the front hood can be latched by means of at least one hood lock. An economically and technically feasible protection provided for pedestrians is accomplished in that at least one four-joint hinge has at least one link whose joint is situated on one of the parts of the front hood and the vehicle body can be displaced in the position thereof due to the force of impact of a pedestrian.

20 Claims, 7 Drawing Sheets

FOREIGN PATENT DOCUMENTS

| | | | | |
|---|---|---|---|---|
| EP | 0509690 | 10/1992 | | |
| GB | 2372536 A * | 8/2002 | ............ | E05D 7/00 |
| JP | 59 026 370 | 2/1984 | | |
| JP | 59156872 | 9/1984 | | |
| JP | 04212677 | 8/1992 | | |
| JP | 09315266 | 12/1997 | | |
| JP | 10152074 | 6/1998 | | |
| JP | 10258774 | 9/1998 | | |
| JP | 11049036 | 2/1999 | | |
| JP | 11115680 | 4/1999 | | |
| JP | 11 291 948 | 10/1999 | | |
| WO | 9718108 | 5/1997 | | |

\* cited by examiner

FRONT OPENING HOOD ASSEMBLY

BACKGROUND OF THE INVENTION

The invention relates to a front-hood arrangement wherein a front hood of a vehicle is coupled to the frame of the vehicle via at least one four-joint hinge, which front hood furthermore can be locked by means of at least one hood lock.

By now, numerous safety devices, such as airbags and the like, for passengers in automobiles are known from practical applications. By contrast, protective measures for pedestrians who are hit by the front end of a passenger automobile have to date scarcely been proposed or implemented in practice. Accidents involving pedestrians which take place at speeds of up to 60 km/h have proven particularly problematical, since, if the pedestrian is hit head-on, his head often strikes the engine hood of the passenger automobile, and the pedestrian dies from his injuries. The seriousness of the injury results from the fact that although the front or engine hood, which is usually formed from thin metal sheet, would tend to bend, it then strikes parts which are arranged beneath the engine hood and in practice cannot be deformed or can only be deformed with difficulty, such as the engine block, the suspension-leg carrier, the air filter, the valve cover or the frame side and cross members of the vehicle. It would be desirable if the consequences of an impact in particular of the head of a pedestrian could be made less severe. By contrast, at speeds of over 60 km/h, the pedestrian, after he has been hit, is thrown over the vehicle.

DE-C-29 22 893 proposes that the engine hood and the wing, in the region of the joint formed between these two parts, be supported, by means of energy-absorbing U-sections which run along the two parts, on body components, and in the event of a collision these U-sections convert the impact into deformation energy. A first drawback of this arrangement is that considerable forces have to act on the sections in order to bend them. Moreover, these otherwise useless U-sections are expensive to procure and difficult to fit.

DE-A-27 37 876 describes an impact protection device which uses a prestressed pivot flap to displace a mesh-like absorption element out of an at-rest position, in which the mesh rests substantially on the front hood, into an absorbing position, which runs substantially in front of the windshield of the automobile. This device is used more to protect the windshield than the pedestrian from an excessively hard impact on the front hood. Moreover, any contact with the sensor which triggers the pivoting movement and is integrated in the front bumper can cause the mesh to be triggered, with the result that a whole range of situations arise in which the mesh completely blinds the driver.

DE-A-28 41 315 describes a safety device in which, in reaction to a signal from a sensor arranged at the front of a vehicle, to detect a collision with a pedestrian, the front hood is displaced out of an at-rest position into an impact position, which is raised with respect to the at-rest position, by a piston-cylinder unit, the displacement being effected by an energy store. During the raising operation, the front hood is pivoted about a horizontal pivot pin which is arranged at the front of the vehicle.

DE-A-197 10 417 describes an arrangement for lifting the front hood in which pivoting about a horizontal pivot pin arranged at the front of the vehicle is triggered by the same pneumatic spring which also assists with the raising of the front hood which is coupled to the other end.

DE-A-197 21 565 describes a safety device on motor vehicles for raising the front hood in which the raising of the front hood takes place in a speed-dependent manner by means of a mechanism which is integral with the hood lock. For this purpose, either the unlocking of the lock which is acted on by a compression spring, which for safety reasons is normally triggered from the driver's compartment, is triggered by a sensor which is triggered by an impact, or alternatively, particularly at relatively high speeds, a piston-cylinder unit which is integrated in the catch bolt of the hood lock is expanded by a propelling charge. A first drawback of this arrangement is that the force required to close the front hood must not exceed a defined threshold, in order to allow the driver to close the front hood with ease. Since the forces which strike in the event of an accident involving a person are considerable, the front hood is pressed down rapidly, and the known injuries occur, in particular in the region of the head. Providing a propelling charge in order to expand a piston-cylinder unit also causes problems, since the service life of this charge, in particular in a relatively unprotected arrangement, is limited, and the charge is difficult to exchange. Moreover, there is a risk of the compression spring and the piston-cylinder unit being triggered simultaneously, with the result that the opening of the front bonnet would become so great that the airstream would bring the hood into contact with the windshield, thus preventing the driver from being able to see.

DE-A-27 11 338 describes a device for damping the impact of a pedestrian, in which an airbag is arranged in the region of the cowl, the filling of which airbag is triggered by a sensor signal. In this case, the airbag may be arranged in such a way that, at the same time, it raises a part of the front hood; to do this it overcomes a spring force which preloads two links, which are connected to one another via a rotation point and one of which is arranged rotatably on the front hood and the other of which is arranged rotatably on a fixed part of the motor vehicle, into an angled position. Furthermore, it is proposed to arrange resilient profiled bodies in strip form in the manner of a seal between hood and side parts, in order in this way to provide further protection in the event of an impact.

DE-A-27 11 339 describes a front hood which is coupled at the front side and in which the coupling is designed to be resilient, in such a manner that it allows a horizontal displacement of the front hood through the impact of a pedestrian, the front hood which is displaced toward the rear being connected at the rear side to one end of a rigid locking element, the other end of which, in the event of displacement of the front hood, is displaced upward and toward the rear in a guide curve in such a manner that the front hood executes an upward movement. This lifting only takes place if horizontal displacement of the front hood has actually occurred, which is not always the case, for example, in the event of impacts of children.

EP-A-0 509 690 describes a front hood, which at its front side is coupled to the vehicle structure in such a manner that, as a result of an impact, the front hood is displaced toward the rear, the closure or pivot means arranged at the rear side, as a result of a movement of the front hood toward the rear, triggering an upward pivoting movement of the front hood, so that the deformation travel of the hood is increased in the event of the impact of a pedestrian. The pivoting movement is guided, for example, by a four-joint hinge, which is otherwise used to pivot the front hood when it is desired to release access to the engine and other parts. In this case too, the front hood is only lifted in the event of a very substantial displacement of the front hood, while a weak impact does not displace the front hood toward the rear and therefore upward.

DE-A-197 12 961 describes the arrangement of a front hood on a vehicle in which a hinge is arranged on a hinge mount, which hinge, in the event of a collision with a pedestrian, is pivoted upward in order to raise the front hood. A problem of this arrangement is that the hood lock for the front hood defines a pivot axis which does not allow optional displacement of the hinge mount, and consequently the hinge mount described is, for example, blocked.

JP-A-11 115 680 describes a front-hood arrangement in which the front hood is raised as a result of a suitable signal from a collision detector in the region of the windshield. In this case, the front hood is raised by means of a piston-cylinder unit, while the pivot joint completes the displacement of the front hood by means of a link, which is arranged in a pivoting articulated manner in the region of the body-side coupling, by displacement in a slot. The piston is not displaced in order to open and close the front hood.

JP-A-10 152 074 describes a front-hood arrangement in which a displacement of the front hoods toward the rear in the event of a head-on crash is to be avoided, the intention being to achieve this by means of a link-slot solution. In this case, a compound table arrangement, by means of which the support part for the hood can be raised and lowered substantially parallel to the body, is provided. It is not possible for the device to be actuated as a hinge for opening the front hood. Accordingly, the front hood is not fixedly connected to the support part, but rather rests on it without being connected thereto.

Overall, as yet no solution has been proposed which proposes an inexpensive arrangement, which can be readily restored after use and which is so well developed that it could be used in mass-produced vehicles.

SUMMARY OF THE INVENTION

It is the object of the invention to propose a front-hood arrangement that supplies pedestrian protection that can be achieved inexpensively and on an industrial scale.

This object is achieved, for the front-hood arrangement described at the beginning, according to the invention, in that the at least one four-joint hinge has at least one link under the load of an impact of a pedestrian, the position of the joint of which on one of the parts front hood or body of the vehicle can be changed.

The design of the four-joint hinge with at least one link which has a variable-position coupling point to a stop part for body or front hood represents an embodiment of the basic idea of the invention, according to which, in the event of an excessive load, the distance between the two coupling points arranged on a stop part or on the body or on the front hood can be changed, in order, in this way, to release the four-joint mechanism for a further pivoting curve which differs from the actual pivoting curve of the four-joint mechanism.

The front-hood arrangement according to the invention advantageously has three limit positions; in addition to the known closed position, in which the front hood is locked, this being the position which is adopted while the vehicle is driving, and the open position, which is likewise known and in which access to the engine compartment is opened up for an operator, there is also a third limit position, which can be described as the overload position and which is explained in detail below, in order to satisfy the demands imposed on the front hood drawing back in the event of the impact of a pedestrian.

The four-joint hinge may advantageously be complemented by means of further joints in order for it to be designed as a seven-joint hinge.

In the starting position, the front hood is locked by the hood lock, which is preferably arranged in the front region of the front hood, the four-joint hinge, comprising two links and two hinge parts, which are connected to the links in an articulated manner at the rotation points arranged in the end regions of the links and which are connected, by known stop means, to the front hood and to the body of the vehicle, defining a pivoting path of the front hood, which allows free, reciprocating pivoting of the front hood between the open position and the closed position to optionally open up access to the engine compartment. In the open position, which is preferably reached with the assistance of a spring, for example a pneumatic spring, the front hood can be held by means of a rod between the body and the front hood, in order to allow an operator access without danger. Alternatively, when a past-dead-center position of the four-joint hinge or of the four-joint hinges is reached, since generally one hinge is arranged at both rear corners of the front hood, which in developed view is of square design, the front hood can be held without external aids.

While the vehicle, which expediently is a passenger automobile, is driving, the front hood is in its closed position and is locked by the hood lock, so that the engine compartment, in which a series of hard components, such as the engine block, the suspension-leg cover and others are arranged, by the front hood in the manner of a protective cover, which is arranged at a sufficient distance from the parts which are dangerous to the head of a pedestrian at least in the event of an impact, on the underside of the front hood has a space optionally lined with a foam, which is designed to be compressible and if appropriate absorbs impact and/or sound energy, or has a free space.

Starting at least from the closed position of the front hood, the front-hood arrangement according to the invention allows the front hood to be displaced toward the overload position, in which the distance between the front hood and the dangerous parts of the engine compartment is reduced; according to the invention, in the event of an overload, the four-joint hinge, as well as, if appropriate, further parts of the front-hood arrangement, for the displacement toward the overload position or into the overload position, convert a proportion of impact energy from the pedestrian into displacement or deformation energy which is such that the impact, when the vehicle is driving at a speed of up to 60 km/h, is very likely not to cause the death of the pedestrian.

Under the load of an impact of a pedestrian, the front hood, by a change in position of at least one joint of the at least one link of the four-joint hinge, is displaced toward the overload position, the displacement travel, as a result of the impact energy being converted due to the gradual yielding of the front hood, alleviating the impact and thus reducing the severity of the impact. It will be understood that a deformation energy of the front hood itself is to be taken into account in this context, this generally only being possible to a limited extent by clamping into a hood lock and two four-joint hinges.

To allow the translational movement of the front hood toward the overload position, at least one of the joints of at least one link of the four-joint hinge is designed to change position, the nature of the change in position, provided that it involves conversion of energy, not being restricted to a specific technical embodiment. Both reversal changes in position by providing energy stores in the manner of springs or the like and irreversible changes in position by means of casings of the link which can be blown off, compressible foam, metal alloys, which at least in sections allow a change in the position given a suitable constriction of the cross section of a slide which bears the link, or also joints which are designed with a clamp fit and are fitted together in two parts, the widening of the press fit supplying the required deformation energy, are suitable. It is also unimportant whether one of the two links of the four-joint hinge is additionally lengthened or the other of the two links is for this purpose shortened, e.g. compressed.

Expediently, the two links of the four oint hinge are designed with in each case one joint of variable position, in which case, in this case too, both a combination of two links which can be displaced in one direction—if appropriate to different degrees—or one extendable and one compressible link are suitable. In addition to the advantage that with two links which are designed to change in position the impact energy is distributed over both links, and therefore the front-hood arrangement can be dimensioned better, it is in this way also easier to absorb an asymmetric impact on the front hood, and the displacement travel of the front hood required to convert the impact energy can accordingly be somewhat shorter, with the result that the distance which has to be left between the front hood and the hard parts of the engine compartment can be reduced and the drag coefficient of the vehicle is less impaired. Moreover, it is then possible to provide the translational movement about the displaceable joints in such a way that, in the event of pivoting toward the overload position, the pivoting movement about the hood lock defines a rotary movement, so that there is no need to provide for a horizontal shift of the front hood. Preferably, both joints which can change position are provided on the stop part for the body, where it is easier to accommodate suitable guide means.

Preferably, the joint which can change its position comprises an integrated energy storage unit which is stressed by the impact energy and therefore effects a change in position of the joint. This refinement is particularly advantageous since, although any unintentional changes in length caused by other overloads, for example by children jumping up and down on the front hood or the like, would lead to a pivoting movement toward the overload position of the front hood, following the unintentional stress the front hood can pivot back into the closed position. This means that the readiness of the vehicle to drive after an overload or an impact can rapidly be restored and, moreover, the four-joint hinge can still be used with unchanged characteristics even after a first impact of a pedestrian on the front hood. The energy stores are expediently arranged in the link in such a way that, in the closed position, they support the holding force of the front hood to such an extent that in the event of a head-on collision passenger protection is not reduced.

The energy store is expediently a spring which may optionally be designed as a tension or compression spring and therefore executes a change in length which takes place in the direction of the force which stresses it. Therefore, a spring can advantageously be used to provide either an actual compression or an elongation of the link through a change in position of the associated joint. The spring may, for example, be a coil spring or the like.

The energy store may furthermore comprise a deformable constituent which converts the impact energy into deformation energy by irreversible, plastic deformation of the deformable component of the energy store. In this case, as a result of the change in length of the link, the impact energy is reduced by the plastic deformation of the deformable component, the resulting change in position or the resulting part of the change in position of the joint being reversible only by a further plastic deformation, for example with the aid of a suitable tool, for which reason, for this component, after an impact the front hood remains permanently displaced toward its overload position.

A preferred deformable component is a covering of the joint in foam or plastic which can be deformed plastically. Alternatively, it is possible for the at least one joint which is designed to change in position to be designed as an articulated end of a short link which, by means of an injection-molded plastic cladding, defines a desired breaking point which breaks in the event of the normal load being exceeded, with the result that the other articulated end of the short link becomes active and releases a new four-joint system. This variant has the particular advantage that the four-joint hinge can be restored by exchanging the short link; alternatively, it is also possible to exchange the entire four-joint hinge and for the destroyed joint to be replaced by recycling. This system has the particular advantage that, in the event of a head-on collision with another vehicle or against a stationary obstacle, the front hood is still held by the other, rigid link, which considerably reduces the risk of the front hood forcing its way through the front window and thus entering the passenger compartment of the vehicle.

It will be understood that the provision of a plastically deformable injection-molded plastic cladding is equally suitable for tensile and compressive loads.

In the case of a telescopic joint, the slide which bears the joint is preferably designed as a piston in a hollow cylinder which is filled with one or more fluid or pasty media, these media being pressed in the cylinder through a restrictor outlet as a result of the accommodated slide penetrating into the cylinder, so that a deliberate selection of the composition of the media and the restrictor enable the resistance of the telescopic joint to be designed both in such a manner that a minimum load initially has to be exceeded and in such a manner that the displacement travel available is optimized. For this purpose, the cylinder may also comprise a mechanical or pneumatic spring.

It will be understood that where the above text refers to a joint which is designed to change in position, this term is not intended to be restricted to an axial change in position, but also is intended to mean a joint which at the same time describes a curved path.

It will be understood that the energy store of the joint which is of changeable position may comprise both a reversible part and also, at the same time, an irreversible part, with the result that the adapting and designing of the four-joint hinge to the expected impact and to the distance of the impact on the front hood, which differs in size from vehicle model to vehicle model, from the hinge parts, which are mounted on the front hood, of the four-joint hinges can be taken into account, and furthermore standardization can be achieved by different designs substantially of the spring, with a plastically deformable component which it otherwise identical for various models of vehicle.

It will be understood that a front-hood arrangement whose translational movement is completely reversible is particularly preferred, since in particular an arrangement of this type can easily be checked for correct operation and reliability during routine tests carried out on the vehicle for technical inspection thereof. Therefore, it is expedient if, when using components which undergo an irreversible change in the event of a collision, these components are arranged in such a manner that they can be checked for damage by visual inspection.

To ensure a displacement starting from the closed position toward the open position or toward the overload position of the front hood relative to the body of the vehicle, it is expedient for the four-joint hinge, at the hinge part which bears against the front hood, to be arranged in a fixed position on the front hood of the vehicle, so that the pivoting movement about the front-hood rotation points of the links can be carried out.

In its closed position, the hood lock is expediently designed in such a manner that it allows horizontal displacement of the front hood in order to allow the rotation points, which have been displaced further toward the rear on account of the at least one link in the event of an overload and act on the front hood, of the at least one link by a corresponding translational movement of the front hood toward the rear. For this purpose, the hood lock may be designed in such a manner that it is designed in a standard way for unlocking, but in the closed and locked state provides a horizontal yield space which expediently allows displacement of the front hood toward the rear counter to a resistance, which is likewise reversibly or irreversibly deformable. For example, the yield space may form the receptacle for a compression spring which, for example, prestresses a holding part of the front hood, which is designed as a bracket part and is held locked in the lock, toward a position which allows unlocking and is stressed in the event of a collision with a pedestrian, with the result that some of the impact energy is absorbed. This measure is particularly advantageous if it is necessary to cushion the impact of the head of a child, which is expected to be predominantly in the front region of the front hood. Furthermore, it is possible to line the yield space with a plastic-foam part which crumbles under the pressure of an impact and can be replaced with a spare after the impact, with the result that the ability of the front-hood arrangement to function is retained for further impacts even after a first impact.

Further advantages and features of the invention will emerge from the following description and from the dependent claims.

DESCRIPTION OF THE DRAWINGS

The invention is explained in more detail below with reference to the appended drawings and on the basis of preferred exemplary embodiments of a front-hood arrangement according to the invention.

DETAILED DESCRIPTION OF THE INVENTION

Figure 1:
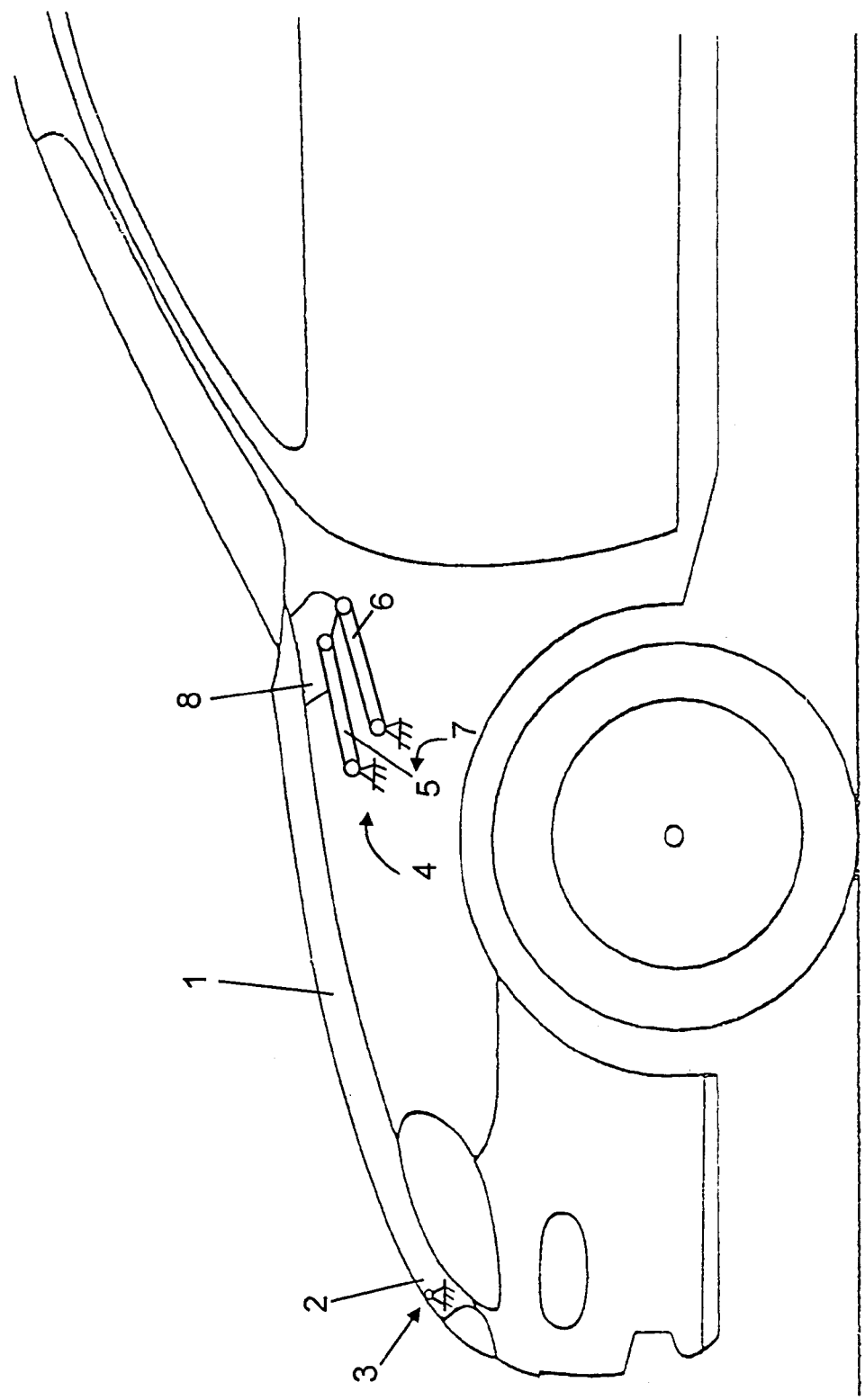
FIG. 1 shows a diagrammatic side view of part of a vehicle with a preferred exemplary embodiment of a front-hood arrangement according to the invention.

FIG. 1 shows a side view of the front part of a motor vehicle, the engine compartment of which can be closed off by a front hood 1. The front hood 1 is locked and unlocked by means of a hood lock 3 arranged in the front region 2 of the front hood 1 and, on its side which faces the driver's compartment, is coupled at each edge side to the frame of the body by means of one of two hinges 4. The hinge 4 is in the present case designed as a four-joint hinge which comprises a longer link 5 and a shorter link 6, the joints of which are pivotably coupled to a part 7 which is secured to the frame and to a part 8 which is arranged on the front hood 1. The front hood 1, by pivoting about the joints on the frame part 7, can be pivoted out of the closed position illustrated in FIG. 1 into its open position and back again.

Figure 2:
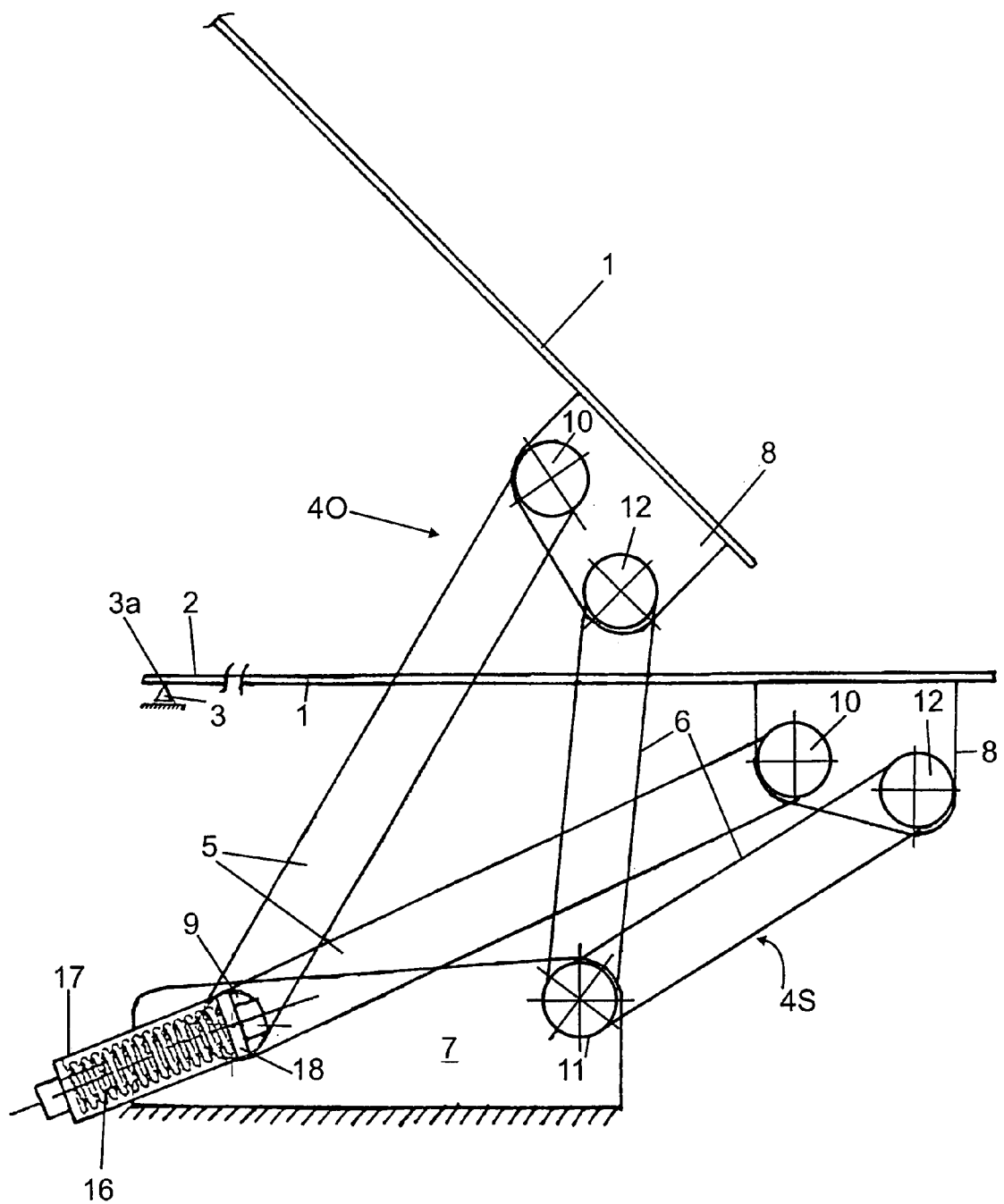
FIG. 2 shows a diagrammatic side view of a first embodiment of a four-joint hinge of the front-hood arrangement from FIG. 1, with the front hood closed and open.

FIG. 2 shows a first preferred embodiment of the hinge 4, the rotary joints of the longer link 5 being denoted by 9 and 10 and the rotary joints of the shorter links being denoted by 11 and 12. It can be seen that all three joints 10, 11 and 12 are arranged in a fixed position in the associated frame part 7 or front-hood part 8.

The rotation point 9 of the longer link 9 is not mounted rigidly in the frame part 7, but rather relative to the frame part 7 mounted on an energy storage unit 16, designed counter to the prestress of a compressible compression spring, substantially in line with the extent of the longer link 5 assigned to the spring 16. As can be seen more specifically in FIG. 2, a part of the dead weight of the front hood 1, in the open position of the four-joint hinge 4 from FIG. 2 illustrated in FIG. 2, on the shorter link 6, which does not give way under this load. It can be seen in particular in FIG. 2 that both in the closed position, which is denoted by the symbol S, and in the open position, which is denoted by the symbol O, the position of the body-side joint 9 of the longer link 5 remains substantially unchanged.

Figure 3:
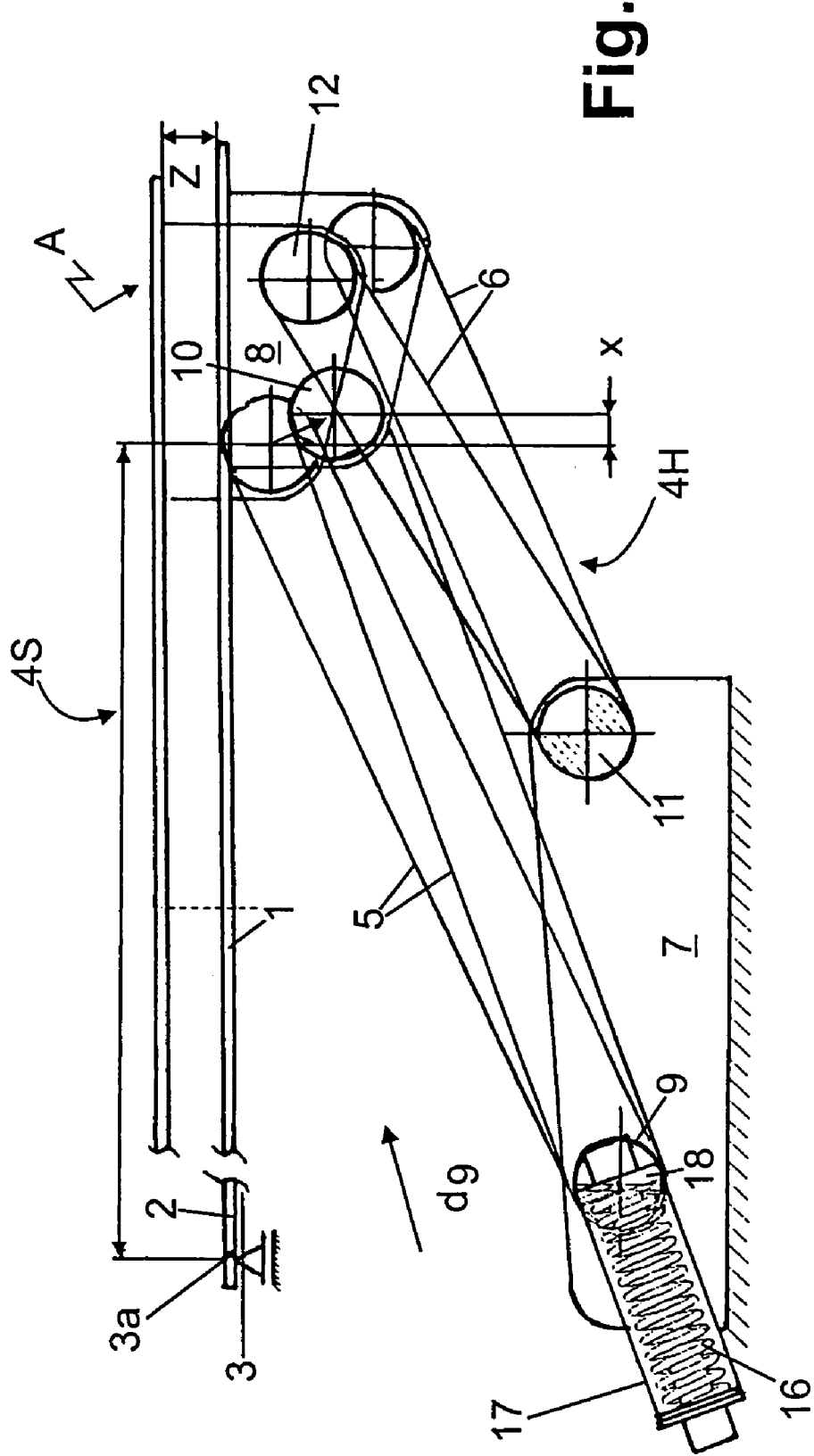
FIG. 3 shows a diagrammatic side view of the four-joint hinge from FIG. 2 with the front hood closed and in the overloaded position.

An energy storage unit 16 is arranged approximately axially in line with the longer link 5 and bears the rotary joint 9 of the latter, which is assigned to the frame part 7, on a slide 18 arranged in a guide 17, with the result that, as shown in FIG. 3, in the event of horizontal displacement x of the front hood 1 as a result of an impact, the spring 16 is extended by an amount $d_9$ and the impact energy is reduced accordingly. The change in height of the front hood 1 is z. The guide 17 integrated into the frame part 7 is substantially aligned with the extent of the longer link 5 in the event of loading H caused by the load of an impact A of a pedestrian. It will be understood that a joint of the shorter link 6 could also be designed to change position instead of the joint 9.

Moreover, FIG. 3 diagrammatically depicts the hood lock 3 which, as can be seen from the diagrammatic illustration, is arranged displaceably on the body, in order to allow a horizontal displacement of the front hood 1 which is associated with pivoting of the front hood 1 about the axis which is formed in the hood lock and is denoted by 3a. It can be seen that the front hood 1, in the region of the hood part 8 mounted on it, executes a displacement travel v. The travel v is composed of a horizontal component x and a vertical component z, which are likewise shown in FIG. 3. It can therefore be seen that, in the event of a collision with a pedestrian, the front hood is lowered by the amount z, and accordingly reduces its distance from the parts in the engine compartment which may be hard and therefore risk causing injury, while, at the same time, the front hood 1 and therefore also the hood lock 3 are displaced by the amount x toward the rear, as seen in the direction of travel. If all four joints were designed to be stationary, the translational movement could not be completed by the four-joint hinge 4, since the four joints 9 to 12 only define one pivoting travel, namely that which forms the basis for the opening movement of the front hood 1, and therefore the translational movement v would be statically overdetermined. Because the joint 9 is designed to change its position, the static overdetermination of the four-joint mechanism 4 is eliminated, and the impact energy produced by the impact of a pedestrian on the front hood 1 is converted into the corresponding deformation energy (and into further energy components which reduce the impact for other reasons). The change in position of the joint 9 is denoted by $d_9$ in FIG. 3. It can be seen that for a relatively significant vertical displacement z, a slight change in position of the joint 9, which runs along a continuous extensive curve d over z, is sufficient to provide realistic conversion of the impact energy into deformation energy of the energy storage unit 16. It can also be seen that, as a result of the change in position of the joint 9, the angular position of the two links 5 and 6 with respect to one another has changed slightly, this position otherwise statically determining the four-joint mechanism 4.

Unless expressly stated otherwise, in the description of the exemplary embodiments which follows, the same reference numerals denote the same parts as in FIG. 1 to 3, and to this extent reference is made to the above explanations, in order to avoid repetition.

Figure 4:
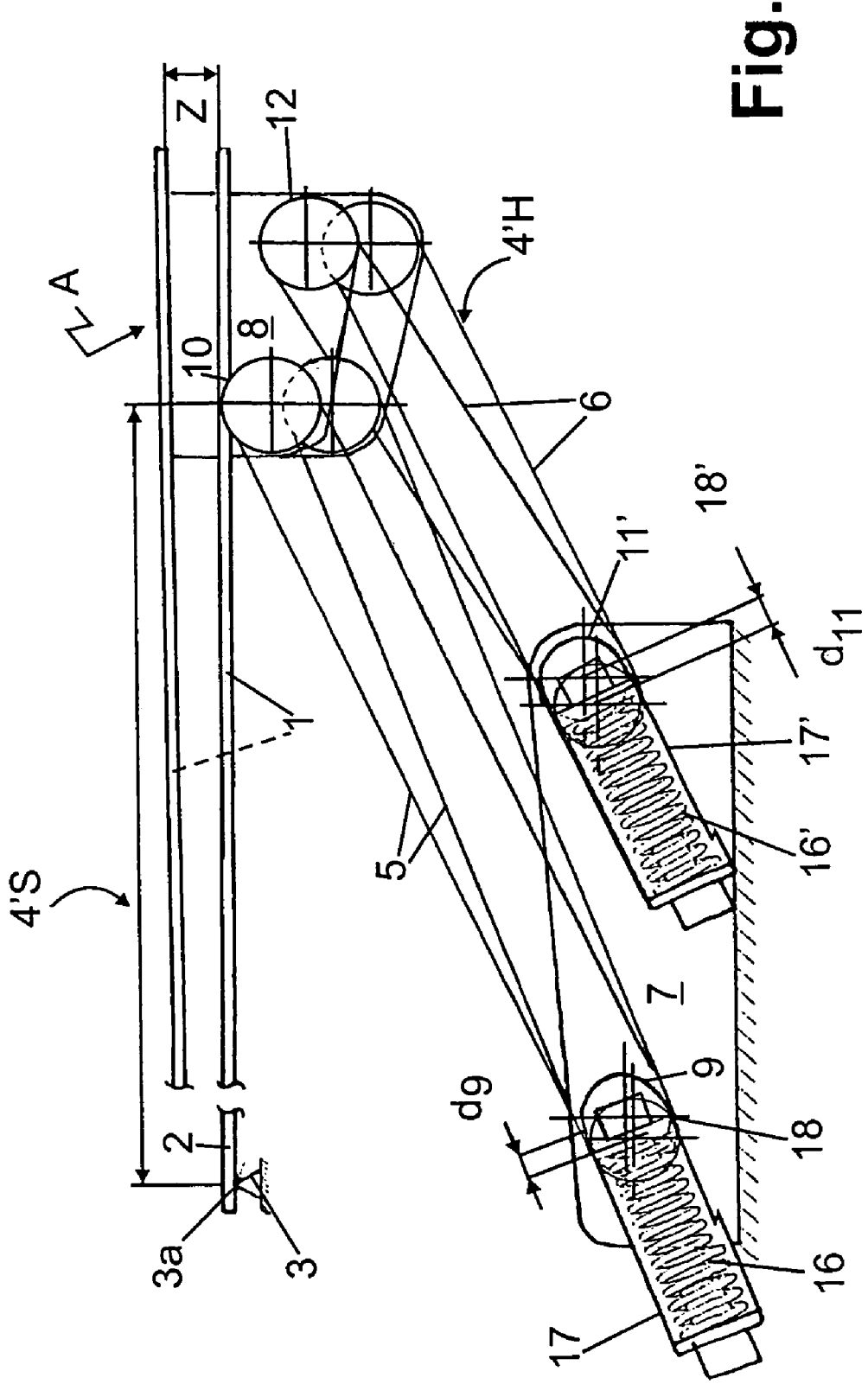
FIG. 4 shows a diagrammatic side view of a further embodiment of a four-joint hinge of the front-hood arrangement from FIG. 1 with the front hood closed and in the overloaded position.

In the further exemplary embodiment with a four-joint hinge 4' shown in FIG. 4, the joint 11' of the shorter link 6 is likewise designed to change in position, this change in position being effected using the same means as for the joint 9. As can be seen from FIG. 4, in the event of an impact both springs 16, 16' are compressed, with the result that it is possible for the front hood 1 to rotate about the axis 3a of the hood lock 3 and there is no need for a horizontal displacement of the front hood 1. It can be seen that the position of the two joints 9, 11' with respect to one another also changes. It will be understood that in principle it is possible for the joints which can change position also to be provided on the front-hood part 8, but the guides may more favorably be arranged on the body part 7 without risk of injury to a pedestrian.

This particularly preferred embodiment of the four-joint hinge 4' has the particular advantage that the hood lock 3 only defines an axis of rotation about the hood lock axis 3a, and the horizontal displacement of the front hood 1 and therefore of the hood lock 3 required in the previous exemplary embodiments is compensated for by the difference between the change in position $d_9$ of the joint 9 of the longer link 5 and $d_{11}$ of the joint 11' of the shorter link 6. Therefore, the front hood 1 pivots about the axis 3a of the hood lock 3, and only the height of the front hood 1 is changed starting from the closed position illustrated in dashed lines in FIG. 4 moving into the overload position H illustrated in solid lines. It can be seen that the change in position of the joint 9 is less than that of the joint 11', with both springs 16, 16' being compressed. Accordingly, the energy storage unit 16, 16' in both link guides 17, 17' is designed as a compression spring, with the result that, advantageously, during pivoting of the front hood 1 into the open position O (not shown) out of the closed position S illustrated in dashed lines in FIG. 4, the dead weight of the front hood 1 is absorbed by the same compression springs.

Figure 5:
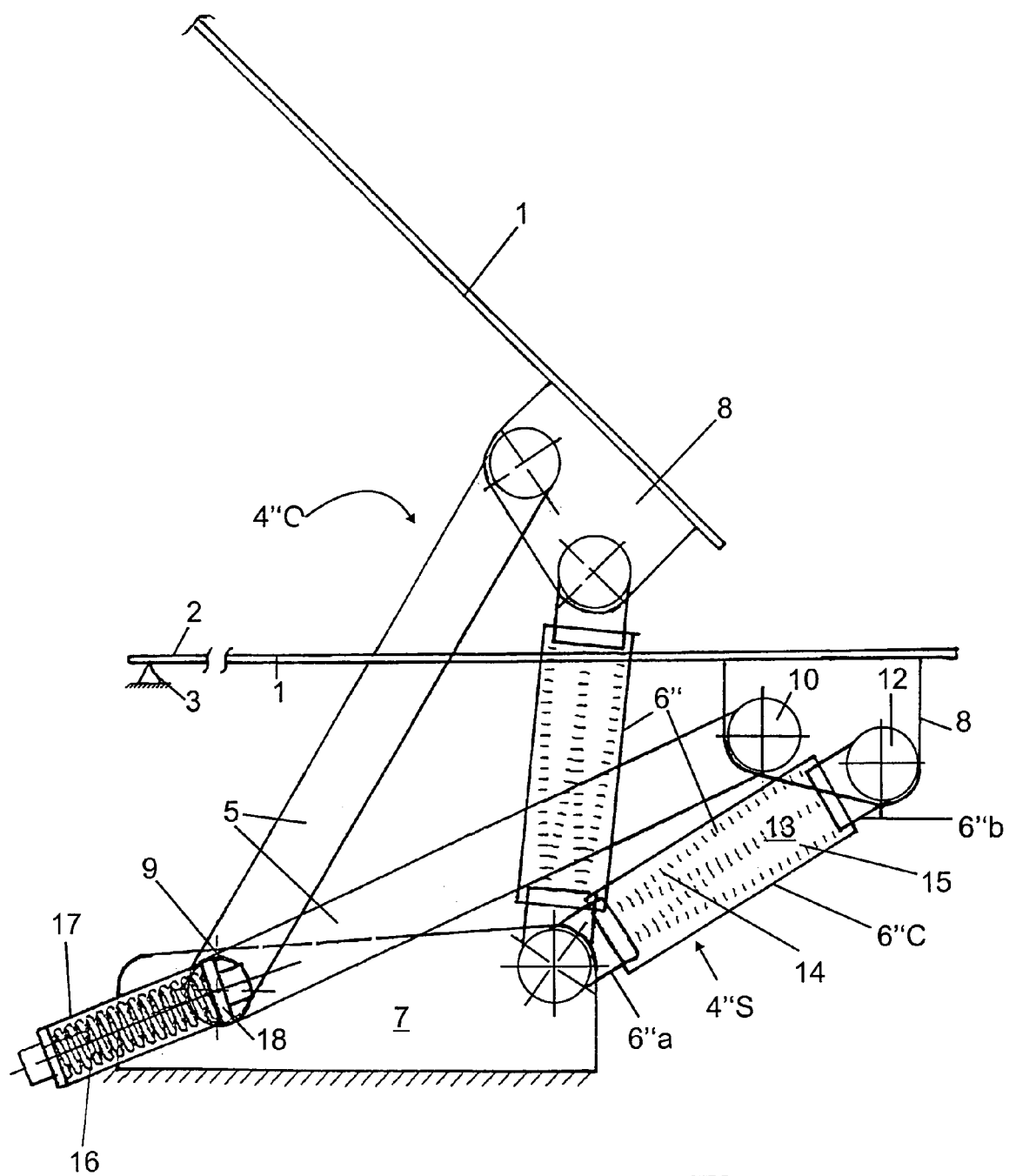
FIG. 5 shows a diagrammatic side view of a further embodiment of a four-joint hinge of the front-hood arrangement from FIG. 1 with the front hood closed and open.
Figure 6:
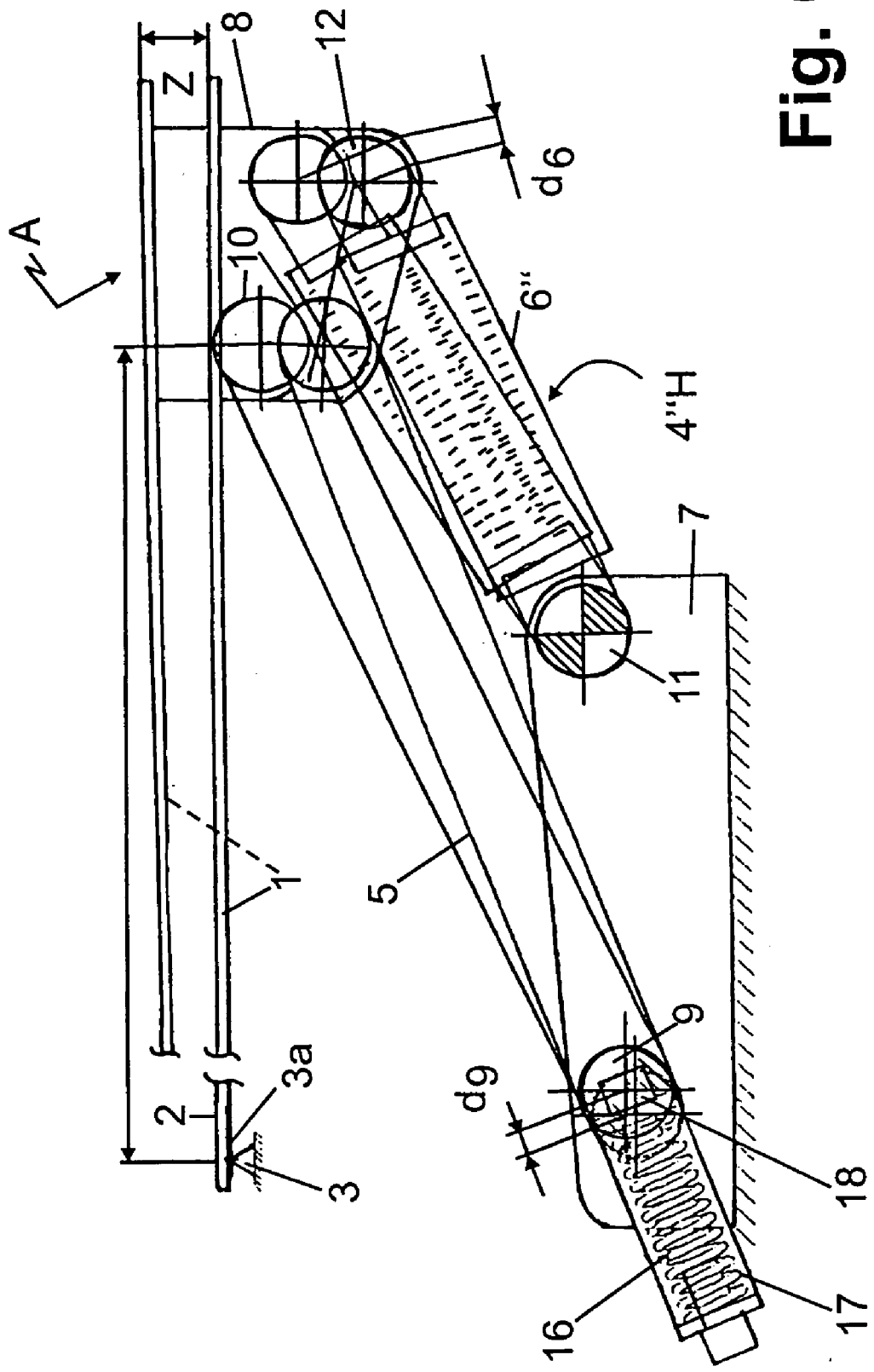
FIG. 6 shows a diagrammatic side view of the four-joint hinge from FIG. 5 with the front hood closed and overloaded.

An advantageous variant of a four-joint hinge 4" is shown in FIGS. 5 and 6. In those figures, unlike in the exemplary embodiment shown in FIGS. 2 and 3, the shorter link 6" is not of rigid design, but rather is of variable length. While the longer link 5 is designed as a rigid link, the shorter link 6", in a central region 6"c which is adjoined by the end pieces 6"b and 6"a which have the same joint action as the rotary joints 11, 12, is equipped with an integrated energy store 13 which is designed as a double spring and allows a change in the length of the shorter link 6", in such a manner that the distance between the axes of the rotary joints 11 and 12 can be changed. To achieve this, the energy store 13, which is formed by means of strong tension springs, has to be loaded to such an extent that its prestress is overcome, the load being such that it must significantly exceed the dead weight of the front hood 1 arranged on the hood part 8. In addition to a compression spring 14, a tension spring 15 is also integrated in the section 6"c of the shorter link 6", so that the preset distance between the axes of the rotary joints 11, 12 is maintained by the length of the shorter link 6" which is represented in the load-free state.

FIG. 6 shows the case of an overload caused by the impact of a pedestrian on the front hood 1 and the resulting deformation of the four-joint hinge 4" as a whole and in particular of the shorter link 6" in more detail. In FIG. 4, the closed position S is illustrated in dashed lines while the overload position H caused by an impact of a pedestrian, diagrammatically indicated by arrow A, is illustrated by continuous lines. The change in the length of the shorter link 6" takes place on the basis of an energy store 13, which is preferably designed as a compression spring and the extent of which is greater than the compression of the energy storage unit 16 caused by the displacement of the rotary joint 9. The particular advantage with the present embodiment consists in the fact that, in the open position of the front-hood arrangement, which is denoted by O in FIG. 5, the link 5 is rotated relative to the axis of the receiving part 17 for the energy storage unit 16 in such a manner that there is no possibility of the unit giving way.

Figure 7:
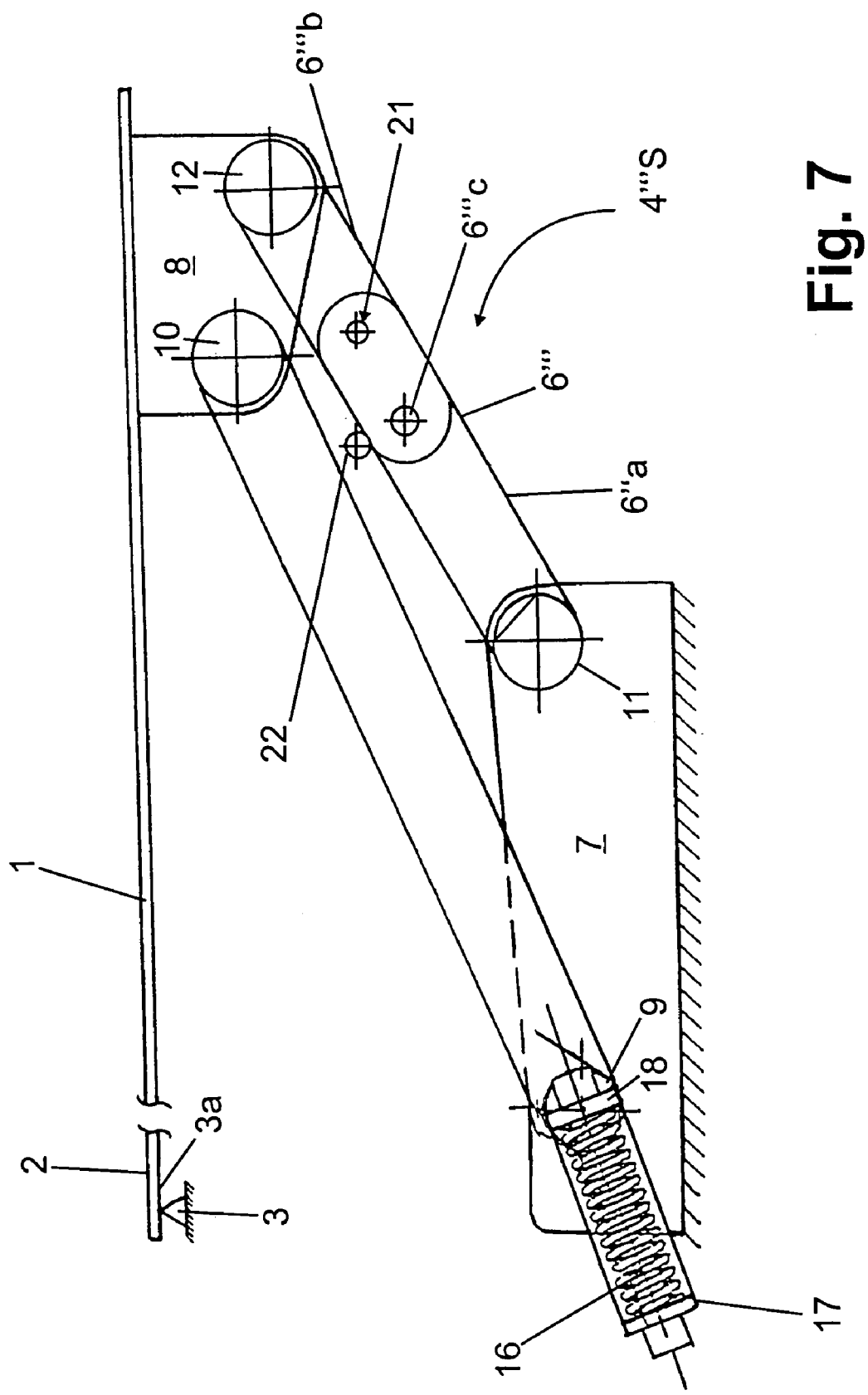
FIG. 7 shows a diagrammatic side view of a further embodiment of a four-joint hinge of the front-hood arrangement from FIG. 1 with the front hood closed.

A further embodiment of a four-joint hinge 4''' for a front-hood arrangement as shown in FIG. 1 is illustrated in FIG. 7. This front-hood arrangement shows only the closed position S of the front hood 1.

The link 6''' of the four-joint hinge 4''' is in this case designed in such a manner that it can be separated into two parts, as a result of the links 6''' being divided into two partial links 6'''a and 6'''b, which are connected to one another by means of an auxiliary joint 6'''c. In the event of an overload, a shear-off bolt 21 is sheared off by a stop 22 arranged on the hood part 8, and in this way rotation of the front hood 1 about the hood lock 3 without horizontal displacement of the hood is made possible.

The invention has been explained in more detail above with reference to various exemplary embodiments which have all shown energy stores which are designed reversibly, as springs, which are particularly preferred. It will be understood that, in the same way as the springs, it is also possible to provide plastically changeable material components which effect an irreversible change in position of the joint 9 and/or 11', which therefore represent a lower mechanical outlay during assembly and manufacture.

What is claimed is:

1. A front hood assembly for attachment to a vehicle, comprising
a front hood,
at least one hood lock for closing said front hood, and
at least one four-joint hinge coupling said front hood to a frame of said vehicle, said four-joint hinge comprising a first link and a second link being operable to swing said front hood from a closed position to an open position and from an open position to a closed position,
wherein at least one of said first and said second link includes a joint being displaceably received on one of said front hood and said frame and capable to change its position under the load of an impact of a pedestrian onto the closed front hood.

2. A front hood assembly for attachment to a vehicle, comprising
a front hood;
at least one hood lock for closing said front hood; and
at least one four-joint hinge coupling said front hood to a frame of said vehicle, said four-joint hinge comprising a first link and a second link being operable to swing said front hood from a closed position to an open position and from an open position to a closed position;
wherein at least one of said first and said second link includes a joint being displaceably received on one of said front hood and said frame and capable to change its position under the load of an impact of a pedestrian onto the closed front hood;
wherein the four-joint hinge, when the vehicle is ready to drive, is arranged in a resilient, raised position.

3. The front hood assembly as claimed in claims 2, wherein said second link comprises a joint which can be changed in position.

4. The front hood assembly as claimed in claim 2, wherein the joint which can change in position is prestressed into an at-rest position by an energy store.

5. The front hood assembly as claimed in claim 4, wherein the energy store comprises a spring that is capable of being stressed.

6. The front hood assembly as claimed in claim 4, wherein the energy store comprises a deformable component which converts energy from the impact into deformation energy through plastic deformation of the deformable component.

7. The front hood assembly as claimed in claim 2, wherein the front hood has two sides, and
wherein a four-joint hinge is arranged on both sides of the front hood.

8. The front hood assembly as claimed in claim 2, wherein said vehicle comprises a windshield, and
wherein the front hood, at the same time as the at least one joint changes position, executes a translational movement in the direction toward said windshield of the vehicle.

9. The front hood assembly as claimed in claim 2, wherein said at least one link of said at least one four-joint hinge comprises at least one rotary joint, and
wherein said at least one rotary joint is arranged fixed to a front-hood mounting part of the front hood.

10. The front hood assembly as claimed in claims 2, wherein said second link is adapted to change in length, wherein both of said at least one link and said second link are mounted on the front hood via one front hood rotary joint and on the frame via one body rotary joint,
wherein the frame rotary joint of said at least one link comprises an energy storage unit that is prestressed toward an at-rest position,
wherein, in the event of an impact of a pedestrian on the front hood, the front hood rotary joints execute a defined movement about the frame rotary joints and said at least one link stresses said energy storage unit for changing the position of the frame rotary joint of said at least one link in order to at least partially compensate for the change in length of said second link.

11. The front hood assembly as claimed in claim 10,
wherein the energy storage unit is arranged substantially as an axial extension of the link to which it is associated.

12. The front hood assembly as claimed in claims 2,
wherein said at least one link has at least two adjacent joints arranged on a mounting part of the front hood and on a mounting part of the frame that are separated by a distance, and
wherein said distance increases in the event of an impact of a pedestrian with said front hood.

13. The front hood assembly as claimed in claims 2,
wherein the four-joint hinge is arranged on the frame of the vehicle in such a manner that the front hood can be opened when the hood lock is released without the position of the at least one joint of the four-joint hinge changing.

14. The front hood assembly as claimed in claims 2,
further comprising at least one further link that is designed to change in length.

15. The front hood assembly as claimed in claims 2,
further comprising at least one further link that is of collapsible design so that the further link can be separated into at least two portions.

16. A four-joint hinge for use in a vehicle, comprising
a first link, and
a second link adjacent to but not contacting said first link,
both of said first link and said second link being pivotably received in respective articulation points of a first mounting part and a second mounting part,
wherein a distance between the articulation point of said first link and the articulation point of said second link in at least one of said first mounting part and said second mounting part can be changed in response to an overload acting on at least one of said first mounting part and said second mounting part.

17. A motor vehicle, comprising
a body,
a front hood, and
a four-joint hinge comprising a first lever-type link and a second lever-type link for coupling said front hood to said body, wherein a first joint of said first link and a first joint of said second link are assigned to said front hood and wherein a second joint of said first link and a second joint of said second link are assigned to said body,
wherein at least one of said joints is displaceably arranged on one of said front hood and said body when the front hood is in a closed position,
such that said front hood is capable of being lowered from said closed position into an overload position under the load of an impact of a pedestrian while at least one of said joints is displaced.

18. The motor vehicle as claimed in claim 17, further comprising a hood lock, wherein the hood lock, when said front hood is lowered from said closed position into an overload position under the load of an impact of a pedestrian while said at least one of said joints is displaced, allows the front hood to carry out a rearward movement.

19. The motor vehicle as claimed in claim 17,
wherein said displaceable joint is received in a guide, and
wherein said guide is arranged at one of the front hood and the body.

20. The motor vehicle as claimed in claim 19,
wherein said at least one four-joint hinge comprises a body mounting part connected to said body and a front hood mounting part connected to said front hood, and
wherein said guide is disposed in one of said body mounting part and said front hood mounting part.

* * * * *

UNITED STATES PATENT AND TRADEMARK OFFICE
CERTIFICATE OF CORRECTION

PATENT NO.   : 6,964,316 B1
DATED        : November 15, 2005
INVENTOR(S)  : Andreas Polz et al.

It is certified that error appears in the above-identified patent and that said Letters Patent is hereby corrected as shown below:

<u>Title page</u>,
Item [75], Inventors, should include -- Lazlo Kreth, Pfugstadt, GERMANY and Ingo Renneisen, Hochheim, GERMANY --.
Item [73], Assignee, should read -- Edscha AG, Remscheid (DE) and Adam Opel AG, Ruesselsheim, (DE) --.

Signed and Sealed this

Seventh Day of March, 2006

JON W. DUDAS
*Director of the United States Patent and Trademark Office*